United States Patent
Lettis et al.

(10) Patent No.: US 11,890,989 B2
(45) Date of Patent: *Feb. 6, 2024

(54) EXTERNAL REARVIEW DEVICE, EXTERNAL REARVIEW DEVICE KIT AND VEHICLE

(71) Applicant: SMR Patents S.à.r.l., Luxembourg (LU)

(72) Inventors: Andrew Lettis, Portchester (GB); Graham Rehill, Portchester (GB); Callum Scott-Collins, Portchester (GB); Andreas Herrmann, Stuttgart (DE); Arne Schmierer, Stuttgart (DE); Simon David Field, Lonsdale (AU); Jakub Spychala, Portchester (GB); Kane Connor, Portchester (GB); Francis Charlet, Dammarie les Lys (FR); Steve Horne, Portchester (GB)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,264

(22) Filed: Sep. 7, 2022

(65) Prior Publication Data

US 2023/0052738 A1    Feb. 16, 2023

Related U.S. Application Data

(63) Continuation of application No. 17/680,658, filed on Feb. 25, 2022, which is a continuation-in-part of
(Continued)

(30) Foreign Application Priority Data

Jan. 24, 2012  (AU) ............................. 2012900267
Sep. 11, 2012  (DE) ......................... 102012108480.7
(Continued)

(51) Int. Cl.
  *B60R 1/12*     (2006.01)
  *B60R 1/06*     (2006.01)
  *H04N 23/90*    (2023.01)

(52) U.S. Cl.
  CPC ................ *B60R 1/12* (2013.01); *B60R 1/06* (2013.01); *H04N 23/90* (2023.01); *B60R 2001/1253* (2013.01)

(58) Field of Classification Search
  CPC . B60R 2001/1215; B60R 1/006; B60R 1/007; B60R 1/06; B60R 1/08;
(Continued)

(56) References Cited

U.S. PATENT DOCUMENTS 10,315,578 B2 *  6/2019  Kim .................. G01S 17/931
2009/0183209 A1  7/2009  Wilfinger
(Continued)

FOREIGN PATENT DOCUMENTS

JP    2014 061808 A    4/2014
JP    2016 037109 A    3/2016
WO   WO 01/96149 A1   12/2001

OTHER PUBLICATIONS

International Search Report dated Dec. 11, 2018 of International application No. PCT/EP2018/079886.
(Continued)

*Primary Examiner* — Nathnael Aynalem
(74) *Attorney, Agent, or Firm* — Jones Day

(57) ABSTRACT

An assembly set for assembling an external rearview system for a motor vehicle is provided. The external rearview
(Continued)

system when assembled may include a base assembly provided for arrangement on the motor vehicle, and a head assembly attached to the base assembly. The assembly set may include (i) a first head assembly comprising a first rearview device comprising at least one reflective element in form of a mirror glass, and (ii) a second head assembly with at least one component of a camera monitor system. The head assembly may be configured to be detachable and is selected to be the first or second head assembly, with the first and second head assembly being exchangeable with each other.

24 Claims, 12 Drawing Sheets

Related U.S. Application Data application No. 16/757,834, filed as application No. PCT/EP2018/079886 on Oct. 31, 2018, now Pat. No. 11,273,764, which is a continuation-in-part of application No. PCT/EP2018/067842, filed on Jul. 2, 2018, and a continuation-in-part of application No. 15/800,413, filed on Nov. 1, 2017, now abandoned, which is a continuation-in-part of application No. 15/603,751, filed on May 24, 2017, now Pat. No. 10,759,345, and a continuation-in-part of application No. 15/607,894, filed on May 30, 2017, now Pat. No. 10,744,947, which is a continuation-in-part of application No. 15/000,754, filed on Jan. 19, 2016, now Pat. No. 9,796,333, which is a continuation-in-part of application No. 14/022,896, filed on Sep. 10, 2013, now abandoned, said application No. 15/607,894 is a continuation-in-part of application No. 15/439,188, filed on Feb. 22, 2017, now Pat. No. 10,703,821, which is a continuation of application No. 14/936,024, filed on Nov. 9, 2015, now Pat. No. 9,656,601, which is a continuation-in-part of application No. 14/374,376, filed as application No. PCT/AU2013/000047 on Jan. 24, 2013, now Pat. No. 9,181,616.

(30) Foreign Application Priority Data

| Nov. 14, 2016 | (EP) | ..................................... 16198759 |
|---|---|---|
| Jul. 2, 2018 | (DE) | .......................... 102018116008.9 |
| Jul. 2, 2018 | (DE) | .......................... 102018116011.9 |
| Oct. 4, 2018 | (EP) | ..................................... 18198678 |
| Mar. 25, 2021 | (DE) | ............................ 102021107597 |

(58) Field of Classification Search
CPC ..... B60R 2011/0003; B60R 2300/8066; B60R 2300/8026; B60R 2300/802; B60R 2300/8046; B60R 11/04; B60R 1/12; B60R 1/00; B60R 1/066; B60R 1/072; B60R 2001/1253; B60R 1/07; B60R 1/074; B60R 1/076; B60R 1/1207; B60R 2300/10; B60R 2300/306; B60R 1/078; B60R 2001/1238
USPC ........................................................ 348/148
See application file for complete search history.

(56) References Cited

U.S. PATENT DOCUMENTS

| 2015/0085337 | A1* | 3/2015 | Lee | ................... B60R 1/088 |
|---|---|---|---|---|
| | | | | 359/267 |
| 2015/0138658 | A1 | 5/2015 | Nishimura et al. | |
| 2015/0293430 | A1* | 10/2015 | O'Neill | ............... G03B 17/566 |
| | | | | 396/544 |
| 2018/0354422 | A1 | 12/2018 | Hottmann | |

OTHER PUBLICATIONS

Written Opinion dated Dec. 11, 2018 of International application No. PCT/EP2018/079886.

\* cited by examiner

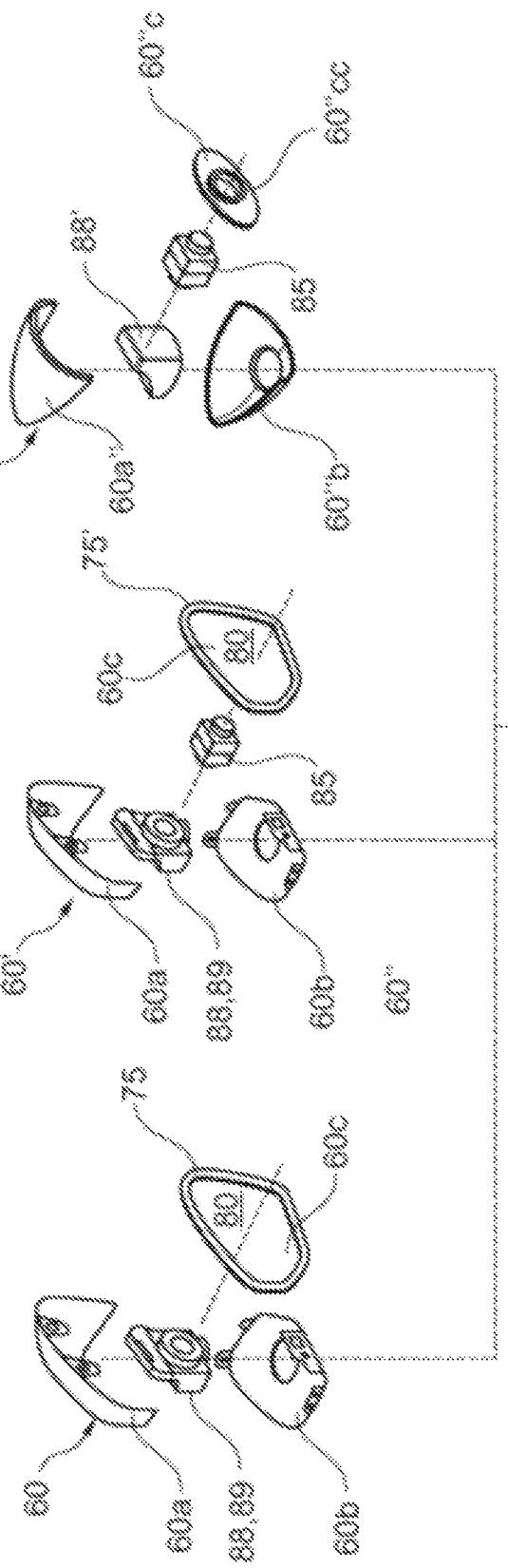

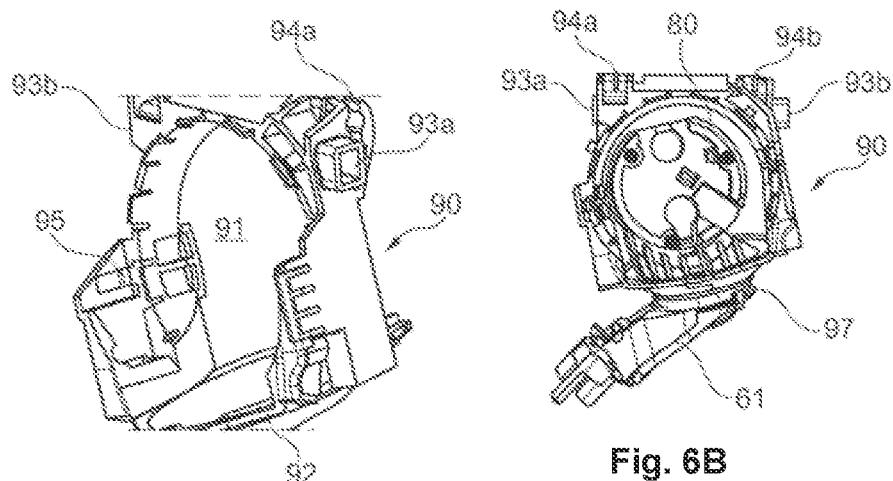
Fig. 6A
Fig. 6B
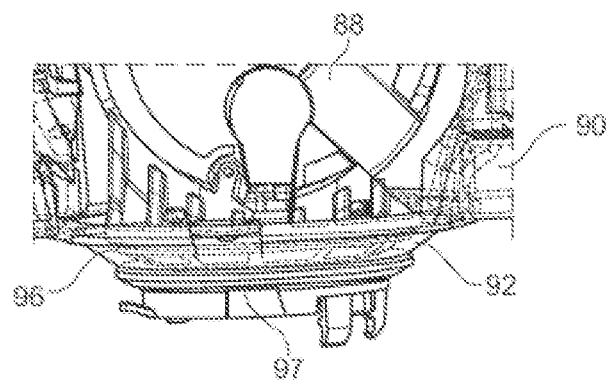
Fig. 6C
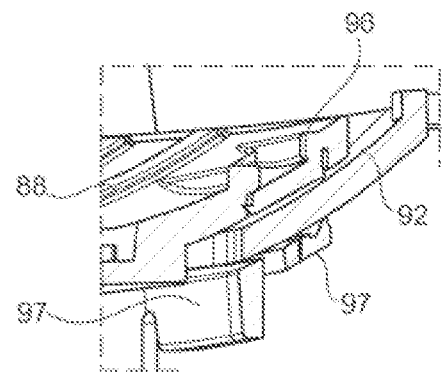
Fig. 6D

EXTERNAL REARVIEW DEVICE, EXTERNAL REARVIEW DEVICE KIT AND VEHICLE

CROSS-REFERENCE TO RELATED APPLICATIONS

This application is a continuation of U.S. patent application Ser. No. 17/680,658, filed on Feb. 25, 2022. U.S. patent application Ser. No. 17/680,658 claims priority to German Patent Application No. DE 10 2021 107 597, filed on Mar. 25, 2021. U.S. patent application Ser. No. 17/680,658 is also a continuation-in-part of U.S. application Ser. No. 16/757,834, filed on Apr. 21, 2020, which is a National Stage Entry of International Patent Application No. PCT/EP2018/079886, filed Oct. 31, 2018, which claims the benefit of priority to International Patent Application No. PCT/EP2018/067842, filed Jul. 2, 2018; International Patent Application No. PCT/EP2018/079886 also claims the benefit of priority to U.S. patent application Ser. No. 15/800,413, filed Nov. 1, 2017, which is a continuation-in-part of U.S. patent application Ser. No. 15/603,751, filed May 24, 2017, which claims the benefit of foreign priority to European Patent Application No. 16198759.9, filed Nov. 14, 2016; U.S. patent application Ser. No. 15/800,413 is also a continuation-in-part of U.S. patent application Ser. No. 15/607,894, filed May 30, 2017, which is a continuation-in-part of U.S. patent application Ser. No. 15/000,754, filed Jan. 19, 2016, which is a continuation-in-part of U.S. patent application Ser. No. 14/022,896, filed Sep. 10, 2013, which claims the benefit of foreign priority to German Patent Application No. 102012108480.7, filed Sep. 11, 2012; U.S. patent application Ser. No. 15/607,894 is also a continuation-in-part of U.S. patent application Ser. No. 15/439,188, filed Feb. 22, 2017, which is a continuation-in-part of U.S. patent application Ser. No. 14/936,024, filed Nov. 9, 2015, which is a continuation-in-part of U.S. patent application Ser. No. 14/374,376, filed Jul. 24, 2014 and now issued as U.S. Pat. No. 9,181,616, which is a national stage entry of International Patent Application No. PCT/AU2013/000047, filed Jan. 24, 2013, which claims the benefit of foreign priority to Australian Patent Application No. 2012900267, filed Jan. 24, 2012, and claims the benefit of foreign priority to European Patent Application No. 16198759.9, filed Nov. 14, 2016; and which claims the benefit of foreign priority to German Patent Application No. 102018116008.9, filed Jul. 2, 2018, and claims the benefit of foreign priority to German Patent Application No. 102018116011.9, filed Jul. 2, 2018, and claims the benefit of foreign priority to European Patent Application No. 18198678.7, filed Oct. 4, 2018.

Each of the above-referenced priority documents are hereby incorporated by reference in their entirety for all purposes.

BACKGROUND

1. Field

The present disclosure relates to an external rearview device for a motor vehicle. Embodiments of the external rearview device include: a base assembly provided for arrangement on the motor vehicle; a head assembly configured to be attached to the base assembly; and rearview means comprising at least one of a camera unit and a reflective element secured within the head assembly. In addition, the present disclosure relates to an external rearview device kit and a vehicle with an external rearview device of the invention.

2. Related Art

European Patent No. 2 492 145 B1 describes an external rearview mirror with a mirror head and a mirror base, which are covered with at least one body element in the form of a body frame, a body cap and a mirror base cover, and a mirror glass that is installed rigidly relative to the mirror head. The mirror head rests on the mirror base, the body cover of the mirror head is composed of multiple pieces of the body frame and the body cap, where the body cap has an opening designed for the passage of the mirror base and the mirror base cover. The mirror base is rigidly connected to a mirror carrier that carries an electrical glass adjustment drive, where the glass adjustment drive is connected to at least one body element.

Another external rearview mirror assembly for a motor vehicle includes a mirror base or foot provided for arrangement on the motor vehicle and a mirror head arranged on the mirror foot as well as a mirror glass accommodated in the mirror head and arranged rigidly and fixed non adjustably with respect thereto. Such an external rearview mirror is described in European Patent No. 2 492 144 B1. At least one articulation is provided between the mirror head and the arrangement of the mirror foot on the motor vehicle. The articulation includes a total of two articulation axes, and the direction vectors of the articulation axes are independent of each other. The two articulation axes are associated, jointly and/or independently of each other for swiveling the mirror head from an operating position to a swung-in position and vice versa. The articulation axes are also for swinging-in the mirror head in and against the direction of motion, adjusting an individual adjusting position of the mirror glass by adjusting the mirror head depending on, e.g., the seating position and the height of a driver of the motor vehicle. The mirror has a first adjusting drive driven by an electric motor and associated to a first articulation axis of the two articulation axes and a second adjusting drive driven by an electric motor and associated to a second articulation axis of the two articulation axes.

Rearview devices housing a camera in a base assembly to be attached to a vehicle are known in the state of the art. For example European Patent No. 2431225 describes an exterior mirror having a sensor accommodated in the mirror base to which a mirror head carrying a reflective element is mounted. On the other hand a rearview device can be equipped only with different camera and/or illumination devices. It is for example known to moveably attach camera and/or illumination means to a vehicle, see e.g. in German patent application No 10 2017 109 872.0.

SUMMARY

Current state of the art allows for either conventional exterior rearview mirrors or mirror replacement technologies via camera systems. However, not all global markets allow for camera side mirror replacement, which prevents one technical solution for global market vehicles.

It is therefore the object of the present disclosure to further develop the known rearview devices in order to overcome the drawbacks of the prior art.

In embodiments, the head assembly is configured to be detachable and is selected from a set comprising a first head assembly with a first rearview means comprising at least one reflective element, preferably in form of a mirror glass, and a second head assembly with a second rearview means comprising at least one reflective element, preferably in form of an at least partly translucent mirror glass, and at least one first camera unit being configured to obtain a rearview image through the reflective element, and a third head assembly with at least one component of a camera monitor system.

The first, second and third head assembly are exchangeable with each other, and/or the first, second and/or third head assembly is moveably attachable to the base assembly, and/or the base assembly is fixed relative to the motor vehicle.

According to embodiments of the present disclosure, the third head assembly is selected from
- a first third head assembly comprising at least one first camera unit,
- a second third head assembly comprising
  - a third rearview means comprising at least one reflective element in form of an at least partly translucent mirror glass, and
  - a display unit integrated in the head assembly or provided together with the reflective element, and
- a third third head assembly comprising
  - a third rearview means comprising at least one reflective element in form of an at least partly translucent mirror glass,
  - a display unit integrated in the head assembly or provided together with the reflective element, and
  - at least one first camera unit being configured to obtain a rearview image through the reflective element.

In embodiments, at least one second camera unit may be configured to obtain an image through an opening provided by the base assembly of the head assembly, an articulation assembly for moving the head assembly relative to the base assembly, a control unit for controlling at least one of the at least one first camera unit, the at least one second camera unit, the display unit and the articulation assembly, and/or at least one senor unit connected to the control unit may be provided.

In embodiments, the display unit is configured to be at least one of
- viewable through the reflective element when activated and
- activated by at least one of a driver of the motor vehicle, depending on an output signal of a sensor unit, via a vehicle control system and via a control unit provided by the external rearview device.

The first, second and/or third head assembly may be moveably attachable to the base assembly, and the base assembly may be fixed relative to the motor vehicle.

In embodiments, at least one functional module may include:
- a light module, a turn signal indicator module, a blind spot indicator module, or a human machine interface,
- a Bluetooth module and
- a sensor module, a temperature sensor, a touch sensor or a contamination sensor, and/or
at least one of
- at least one first camera connector or camera cradle, which is positioned in a non-moving area of the moveable head assembly and receives a first camera unit, and
- at least one second further camera connector cradle, which is positioned in the base assembly and receives a second camera unit, may be provided.

According to an embodiment, the first, second and third head assembly, especially the second third head assembly and/or the third third head assembly, each comprises at least one cover element having the same structure.

In further embodiments the at least one head assembly cover element comprises an upper cover, a lower cover and a front cover. At least one of the upper cover, the lower cover and the front cover may fit the first, second and third head assembly or may be identical for each head assembly.

In embodiments, the at least one head assembly cover element may comprise a bezel, and the bezel of the second or third third head assembly may have an opening such that the first camera unit can obtain a rearview image through the reflective element.

In a still further embodiments the base assembly may comprise a base frame and at least one cover element to releaseably mantle the base frame by being attached via clip, snap and/or latch connections. The at least one base assembly cover element may comprise an upper base cover, a lower base cover and a base cover cap. Each second camera unit may partly extend through an opening in the at least one of the cover elements, or at least one of a rim and a lens of each second camera unit may be arranged in front of at least one of the cover elements.

According to the present disclosure, an embodiment may be characterized in that the at least one base assembly cover element comprises at least one glare shield surrounding a lens of a second camera unit and providing an opening through which the second camera unit attached to the base assembly can obtain an image.

Each glare shield may be configured to be releaseably attached to at least one of the at least one base assembly cover element and a second camera connector or camera cradle via at least one of a via clip, snap and/or latch connection.

The glare shield may be provided with at least one clip. The at least one clip of the glare shield may be configured to at least one of:
- engaging the base cover cap or at least one extension or lug of the base cover cap and
- being supported by the second camera cradle or at last one retention tab of the second camera cradle.

In the view direction of a first second camera unit, the second camera cradle may be arranged at least partly in front of the base frame, the base cover cap may be arranged at least partly in front of the second camera cradle, and the glare shield may be arranged at least partly in front of the base cover cap.

Further, in embodiments, a second second camera unit obtains an image through an opening provided by the upper base cover, or a third second camera unit obtains an image through an opening provided by the lower base cover.

Furthermore, in embodiments, the first and second head assemblies are moveable and the first third head assembly is fixed, and/or each moveable had assembly comprises an articulation assembly, the articulation assembly comprising a fixed part attached to the fixed base assembly and a moveable part attached to the head assembly.

In embodiments, external rearview devices of the present disclosure may be characterized by a locking system with a locked state and an unlocked state, wherein the head assembly is removable from the base assembly in the unlocked state and locked to the base assembly in the unlocked state, with the locking system preferably being suited to be actuated by a driver of the vehicle to switch between the locked and the unlocked state, and vice versa, and/or with preferably actuating means of the locking system being suited to be actuated manually, electrically and/or via a remote device, such as a smart key or the like, and/or via a gesture and/or voice command.

In embodiments of the present disclosure, a pivot joint system is provided between the base assembly and the head assembly, preferably comprising at least one spherical seat.

Further embodiments of external rearview devices may be characterized by a cradle, wherein the cradle has a seat adapted to be put on the base assembly and to be attached by attaching a case frame to the base assembly, and/or the cradle is configured to attach to the base assembly via the pivot joint system, and/or the cradle comprises a recess or opening for accommodating at last part of the articulation system, preferably an actuator system of the articulation system.

In embodiments, the pivot joint system acts between the base assembly and the case frame and/or bayonet means fixedly attached to the case frame, and/or the pivot joint system comprises a torsion spring, the torsion spring preferably having one end attached to the base assembly and the other end attached to the case frame and/or the bayonet means.

In further embodiments, the cradle, in particular the seat of the cradle, is arranged between two sealing means acting as pivot seals, with preferably one sealing means being attached to the base assembly and the other sealing means being attached to the case frame, and/or with preferably each sealing means being a 2 component gasket with a hard part providing a clips function and a soft part compensating tolerances.

In embodiments of the present disclosure, it is further proposed that the seat of the cradle is a spherical seat, being concentrically to the axis of the pivot joint system.

In further embodiments, external rearview devices may be characterized by at least one functional module, comprising a further camera, a light module, in particular in form of a turn signal indicator module and/or a blind spot indicator module, a display, in particular integrated in the head assembly and/or provided together with the reflective element, a Bluetooth module and/or a sensor module, in particular a temperature sensor.

In an alternative, an external rearview device of the present disclosure is characterized by a camera connector, which is positioned in a non-moving area of the fixed base assembly or in a non-moving area of the moveable head assembly and receives the camera unit.

The first, second and third head assembly each can comprise an upper cover and a front cover, with preferably the first, second and/or third head assembly each comprising a lower cover for housing an internal structure, in particular comprising a case frame and/or the articulation assembly.

In embodiments, the upper covers and/or lower covers of the first and second head assemblies have the same structure, and/or the front covers of the first and second head assemblies have the same structure, and/or the front covers of the first, second and third head assemblies each comprise a bezel, with the bezel of the second head assembly preferably having an opening such that the camera unit can obtain a rearview image through the reflective element and/or comprises the bezel of the third head assembly, and/or the second head assembly comprises the third head assembly.

In addition, in embodiments of the present disclosure, the case frame and/or the articulation assembly is provided with attachment means for the attachment of a fixed component or the camera unit.

Embodiments of external rearview devices of the present disclosure may be further characterized in that the base assembly is configured to receive the first, second or third head assembly via a head assembly interface, and/or the base assembly is selected from a plurality of different base assemblies, in particular comprising a sail mount base assembly, a waist mount base assembly and a door mount base assembly, and/or the base assembly is adapted to the motor vehicle.

Embodiments of the base assembly can comprises a base frame, one or more base covers, a gasket and a pivot seal, with preferably a bayonet tower extending into the head assembly interface.

Furthermore, in embodiments, the camera unit is suited to provide at least a field of view fulfilling the legal requirements and/or a field of view fulfilling outside the legal requirements, with preferably the camera unit of the third head assembly being suited to provide at least a field of view fulfilling the legal requirements and/or the camera unit of the second head assembly being suited to provide at least a field of view fulfilling the legal requirements and/or a field of view fulfilling outside the legal requirements.

Embodiments of the present disclosure also provide an external rearview device kit suited to provide an external rearview device of the present disclosure with at least one base assembly and a first, second and third head assembly.

Embodiments of the external rearview device kit of the present disclosure can be provided with a plurality of base assemblies.

Embodiments of the present disclosure may also provide a vehicle with at least one rearview device of the present disclosure.

Embodiments of the present disclosure provides a modular design of a rearview device allowing a common fit to vehicles and common components to deliver a conventional exterior mirror or a combination of a mirror plus camera or a camera pod system. Multiple embodiments are provided by a rearview device kit of the present disclosure combing one technical solution with respect to the base assembly but still allowing adaption to legal requirements and/or preferences with respect to the rearview means. Thus, a customer can select between multiple different kinds of possible rearview devices, depending on comfort, security and drive assistance features.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the present disclosure:

FIG. 2A is an exploded view of the head assembly of an alternative first rearview device.

FIG. 2B is an exploded view of the head assembly of an alternative second rearview device.

FIG. 2C is an exploded view of the head assembly of an alternative first third rearview device.

FIG. 2D is a perspective view of the base assembly to which any one of the head assemblies of FIGS. 2A, 2B and 2C can be attached.

FIG. 6A is a perspective view of a motor cradle for a first or second rearview device according to the present disclosure.

FIG. 6B is a perspective view of the motor cradle of FIG. 6A together with a case frame attached to a base assembly.

FIG. 6C is a part side view of the motor cradle of FIG. 6A together with a case frame and sealing means, with the motor cradle shown in phantom.

FIG. 6D is a part cross sectional view of the motor cradle of FIG. 6A together with the case frame and sealing means.

Figure 1A:
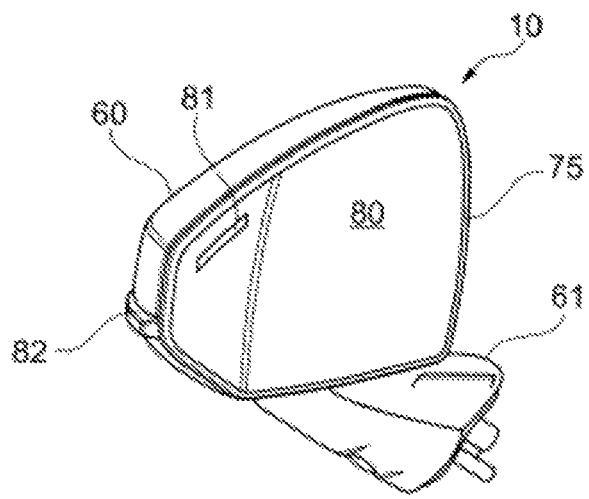
FIG. 1A is a perspective view of a first rearview device of the present disclosure, with a mirror glass.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions.

A first external rearview device 10 according to the present disclosure is shown in FIG. 1A. It comprises a fixed base assembly 61 provided for arrangement on a not shown motor vehicle, a moveable head assembly 60 attached to the base assembly 61, an articulation assembly (not shown), the articulation assembly comprising a fixed part attached to the fixed base assembly 61 and a moveable part attached to the head assembly 60, and a reflective element in form of a mirror glass 80 secured within the moveable head assembly 60. The mirror glass 80 is a conventional mirror reflector. It may be translucent to light at least in a region of the mirror glass to also provide an indicator means 81 with a not shown light module being arranged behind the mirror glass 80 to provide in particular a warning signal. The light module can belong a blind spot indicator module.

Figure 1B:
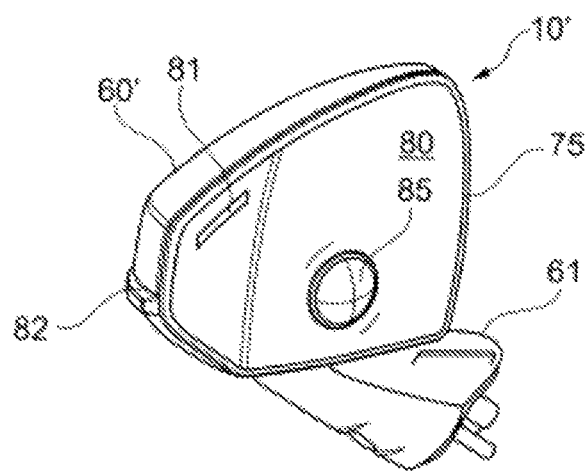
FIG. 1B is a perspective view of a second rearview device of the present disclosure, with a mirror glass and a camera.

A second external rearview device 10' according to the present disclosure is shown in FIG. 1B, which differs from the first external rearview device 10 by comprising a camera unit 85 behind the mirror glass 80', with the camera unit 85 being shown in FIG. 1B through the mirror glass 80', which is translucent at least in the region of the camera unit 85.

Figure 1C:
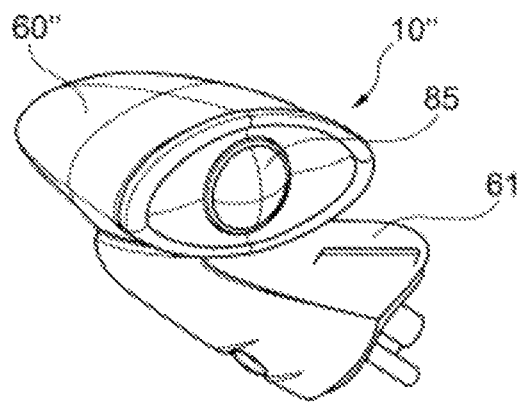
FIG. 1C is a perspective view of a first third rearview device of the present disclosure, with a camera.

A third external rearview device 10" according to the present disclosure is shown in FIG. 1C, which differs from the first and second external rearview devices 10, 10' by comprising a camera unit 85, but no mirror glass.

The common feature of all three external rearview devices 10, 10', 10" is that they make usage of the same fixed base assembly 61 to which in each of the shown alternatives a different head assembly 60, 60', 60" is attached. Thus, the base assembly 61 and the head assemblies 60, 60', 60" form a modular set allowing to selectively attach either the head assembly 60 or the head assembly 60' or the head 60" to the base assembly 61 to provide a high degree of flexibility by using a kit allowing a quick adaption to different legal requirements and/or preferences with respect to external rearview devices.

In order to facilitate the attachment, of one of the three head assemblies 60, 60', 60", locking means, in particular those described in the German patent application no. 10 2017 112 915 filed on Jun. 12, 2017 and U.S. patent application Ser. No. 16/005,923 filed on Jun. 12, 2018 for EXTERIOR REARVIEW DEVICE WITH REMOVABLE HEAD AND VEHICLE THEREWITH, which are hereby incorporated by reference, can be used.

Still further a pivot joint system can be used between the 2 component, namely the base assembly 61 and the head assembly 60, 60', 60", as described in international patent application PCT/EP2018/067842 filed on Jul. 2, 2018, for REARVIEW DEVICE WITH MOVEABLE HEAD ASSEMBLY AND VEHICLE THEREWITH, which is hereby incorporated by reference. Some aspect of this pivot joint system are described below with respect to FIGS. 5A to 5D. This pivot joint system enhances functionality and facilitates the attachment.

FIGS. 2A to 2D show an external rearview device kit comprising three different sets of head assembly 60, 60' and 60" shown in FIGS. 2A, 2B and 2C, respectively, as well as one base assembly as shown in FIG. 2D.

According to FIG. 2A the head assembly 60 comprises a cap or upper cover 60a, a case lower or lower cover 60b as well as a front cover 60c, comprising a bezel 75 carrying a mirror glass 80. The covers 60a, 60b and 60c enclose an internal structure comprising a case frame 88 and an articulation assembly 89 for the mirror glass 80.

In analogy to the head assembly 60 of FIG. 2A which only makes usage of a mirror glass 80, the head assembly 60 of FIG. 2B makes usage of an upper cover 60a, a lower cover 60b, a front cover 60c and an internal structure 88, 89. In addition, a camera 85 is arranged between the internal structure with a case frame 88 and an articulation assembly 89 and the front cover 60c. Still further, the front cover 60 comprises a bezel 75' which is provided with an opening as described with respect to the FIG. 3C below in order to allow the camera 85 to look through the mirror glass 80.

The head assembly 60" of FIG. 2C also makes usage of an upper cover 60a", a lower cover 60'''b and front cover 60'''c enclosing an internal structure in form of a case frame 88" with a camera 85 to be attached to the case frame 88" and extending through an opening 60"cc within the front cover 60"c. The head assembly 60" does not comprise an articulation assembly, but only a case frame 88' to which the camera 85 is to be attached. Thus, no motor is needed and the head assembly 60" is fixed relative to the base assembly 61 when assembled.

Each of the head assembly 60, 60' and 60" of FIGS. 2A, 2B and 2C can be attached to the base assembly 61 shown in FIG. 2D via an bayonet tower 61a and making usage of a special sealing means 97. Further details of the attachment mechanism as well as sealing functions are described in the German application no. 10 2018 116 011 filed on Jul. 2, 2018 for SEALING MEANS, BASE ASSEMBLY WITH SUCH SEALING MEANS AND REARVIEW DEVICE WITH SUCH BASE ASSEMBLY and in the German patent application no. 10 2018 116 008 filed on Jul. 2, 2018 for BASE ASSEMBLY AND REARVIEW DEVICE THEREWITH, which are hereby incorporated by reference.

Figure 3A:
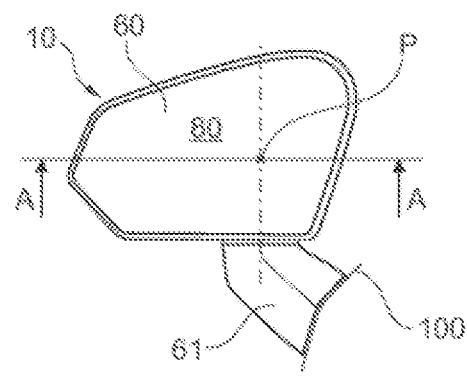
FIG. 3A is a front view of a further alternative of a first rearview device of the present disclosure, with a head assembly providing only a mirror glass.
Figure 3B:
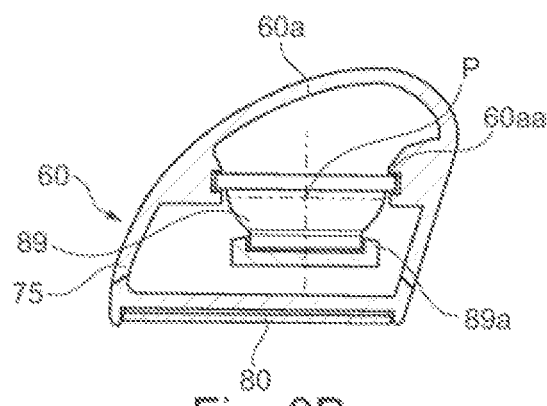
FIG. 3B is a cross-section taken along line AA of FIG. 3A.
Figure 3C:
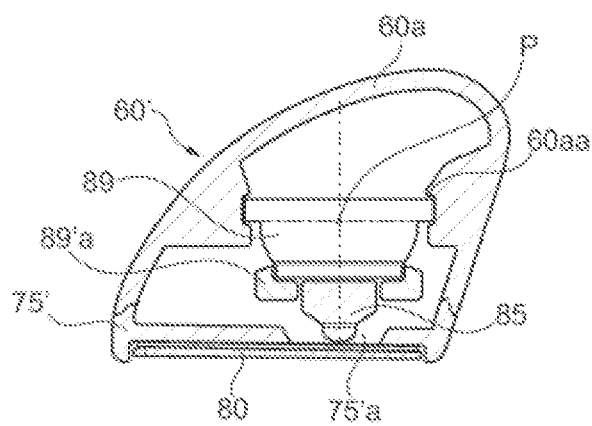
FIG. 3C is a cross-section taken along line AA of FIG. 3A, with a head assembly providing both a mirror glass and a camera.

FIGS. 3A to 3E depict an alternative external rearview device kit according to the present disclosure. FIGS. 3A to 3C explain how to assemble a rearview device with a mirror glass, with or without an additional camera, whereas FIGS. 3D and 3E explain how to assemble a rearview device making usage solely of a camera.

According to FIG. 3A the external rearview device 10 comprises a base assembly 61 attached to a motor vehicle 100, with a head assembly 60 being attached to the base assembly 61, and the head assembly 60 only providing a mirror glass 80. Details of this structure can be obtained from FIG. 3B showing a cross-section along line A-A of the FIG. 3A. Accordingly, the head assembly 60 comprises an upper cover 60a with attachment means 60aa for the internal structure carrying the articulation assembly 89. In addition, the bezel 75 is attached to the upper cover 60a and the lower cover (not shown) to carry the mirror glass 80 with the front cover.

In case not only a mirror glass 80 is to be used, but also a camera 85, the head assembly 60 of FIG. 3B is to be exchanged by the head assembly 60' of FIG. 3C. In fact, the same upper cover 60a and articulation means 89 can be used, whereas only an attachment means 89a is to be exchanged with an attachment means 89'a to hold the camera 85. Still further, the bezel 75' of the front cover of the head assembly 60' is provided with an opening 75'a such that the camera 85 can extend until the rear of the mirror glass 80.

Figure 3D:
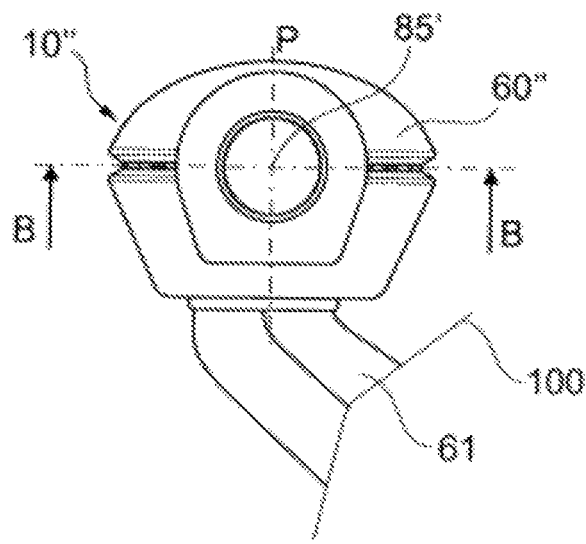
FIG. 3D is a front view of a further alternative of a first third rearview device of the present disclosure, with a head assembly providing only a camera.
Figure 3E:
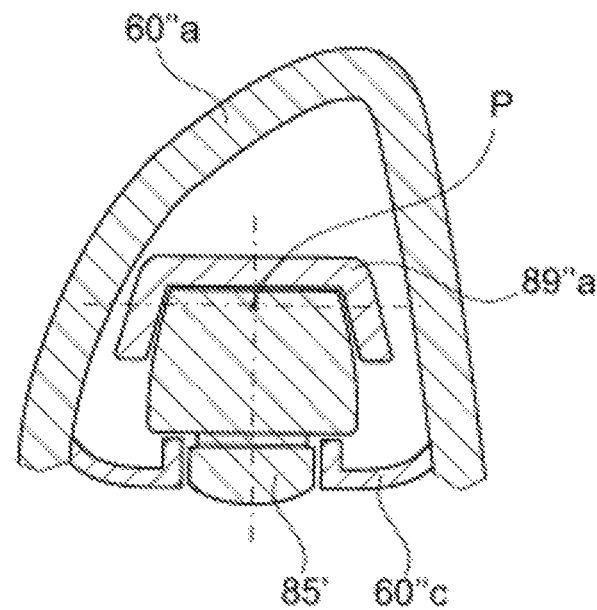
FIG. 3E is a cross-section taken along line BB of FIG. 3D.

FIG. 3D shows a front view of a third rearview device having a base assembly 61 attached to a motor vehicle 100 corresponding to the base assembly 61 of FIG. 3A. Said base assembly 61 of FIG. 3D carries a head assembly 60" shown in further details in FIG. 3E along line B-B of FIG. 3D. The cross section of FIG. 3E shows the upper cover 60"a closed by a front cover 60'''c having an opening 60"cc such that the camera 85', in particular a lens of the camera unit, can extend through said opening 60"cc. The camera unit itself is attached within the head assembly 60" via attachment means 89"a.

The driver and passenger field of view requirements for passenger vehicles determine mirror glass height and mirror proportions, which defines the corresponding dimensions of a head assembly carrying a mirror glass. The field of view which must be present on a rear view mirror is given by a so-called rhombus according to the regulation 46 of the Economic Commission for Europe of the United Nations (UNECE)—Uniform provisions concerning the approval of devices for indirect vision and of motor vehicles with regard to the installation of these devices—specifying the vehicle requirements with respect to safety, among other the minimum height and width of the rear view mirrors of vehicles. The field of view (rhombus) on the passenger side has to be larger than the field of view on the driver side, since the distance between driver and rear view mirror is larger when viewing the rear view mirror on the passenger side. Since the size of rear view mirrors is desired as to be symmetrical for driver and passenger side, the passenger rhombus dictates the size of the rear view mirror also on the driver side. The present disclosures fulfills the demand of providing symmetrical rearview devices for driver and passenger sides when using a camera unit, in particular on the passenger side, with the usage of a camera unit providing further degree of freedom with respect to the size of the rearview devices. When displaying the field of view on the passenger side via a display to the driver, the larger rhombus of the passenger side no longer dictates the size of the rear view assembly on the driver side when using a camera unit. Thus, the rearview device on the driver side can be reduced to a size adapted to the smaller rhombus for the driver side resulting in a much smaller rearview device, especially in a much smaller head assembly. The image size can be adapted electronically when using a camera unit. Therefore the rearview devices with a second or third head assembly can be minimized to the minimum size required for the driver side resulting in a much smaller set of rearview devices to be mounted on vehicles. This size reduction improves the air resistance, noise and the weight of the vehicle and thus its performance.

With a second head assembly of the external rearview device kit a backup solution is provided to observe the traffic conditions behind the vehicle even in case of a malfunction of the camera unit, because the rearview device still comprises a mirror glass providing a field of view of the traffic behind.

Further details on possible size reduction are described in the application no. 18 198 678 filed on Oct. 4, 2018, for REAR VIEW ASSEMBLY VEHICLE WITH SUCH REAR VIEW ASSEMBLY, which is incorporated by reference. The different sizes also become more apparent from the external rearview devices according to the present disclosure shown in FIGS. 4A to 4C.

Figure 4A:
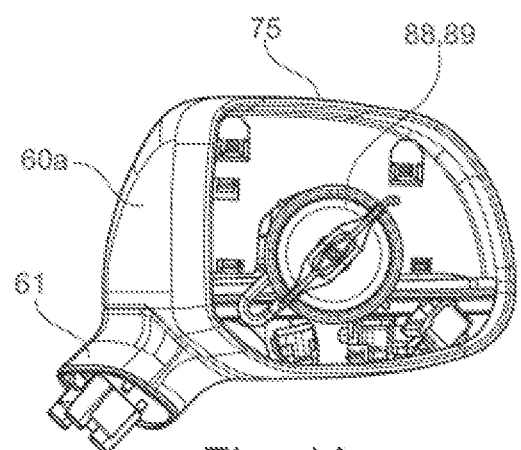
FIG. 4A is a perspective view of a still further first rearview device of the present disclosure, for carrying a mirror glass.

The rear view device of FIG. 4A makes usage of a moveable first head assembly 60 with an upper cover 60a and a bezel 75 for embracing a not shown mirror glass supported on a case frame 88 and an articulation assembly 89. The first head assembly 60 is attached to a base assembly 61 relative to which it can move.

Figure 4B:
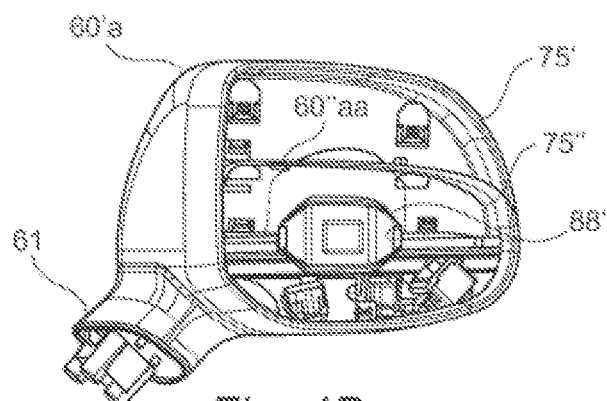
FIG. 4B is a perspective view of a still further second rearview device of the present disclosure for carrying a mirror glass and a camera.
Figure 4C:
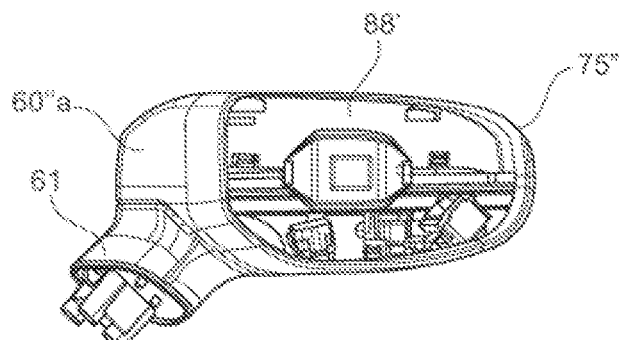
FIG. 4C is a perspective view of a still further first third rearview device of the present disclosure for carrying a camera.

The rear view device of FIG. 4C makes usage of a fixed third head assembly 60" with an upper cover 60"a and a bezel 75" for embracing a not shown camera unit supported only on a case frame 88'. The third head assembly 60" is fixedly attached to a base assembly 61 and has a reduced size in z direction running vertically in FIG. 4C, as the camera unit can be controlled to obtain different field of views, comprising the field of view according to the regulation 46 of the Economic Commission for Europe of the United Nations (UNECE).

The rear view device of FIG. 4B makes usage of a fixed second head assembly 60' comprising the third head assembly 60" as well as a further upper cover 60'a and a bezel 75' for embracing a not shown mirror glass. The second head assembly 60' is fixedly attached to a base assembly 61 and has a larger size in z direction than the third head assembly. The camera unit of the second head assembly can be controlled to obtain different field of views, not restricted to the field of view according to the regulation 46 of the Economic Commission for Europe of the United Nations (UNECE) which is already covered by the mirror glass. Rather, the camera unit can have a field of view outside the field of view according to the regulation 46 of the Economic Commission for Europe of the United Nations (UNECE) allowing a variety of functions in particular suited for drive assistance systems.

Figure 5A:
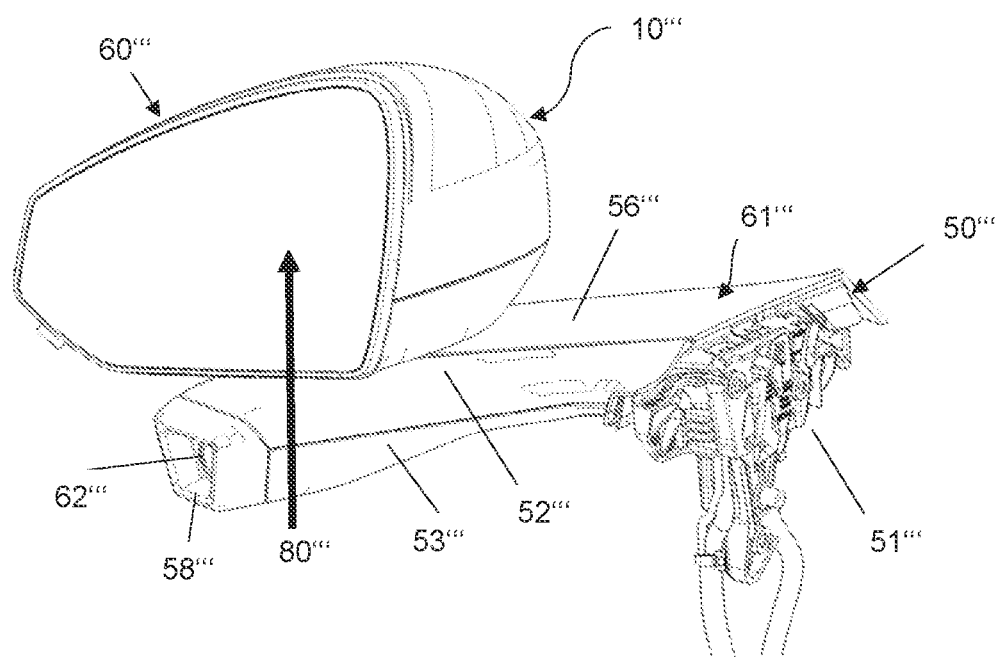
FIG. 5A is a perspective view of a second third rearview device of the present disclosure, for carrying a mirror glass, which is at least partly translucent and a display, and having a further camera arranged within the base assembly.
Figure 5B:
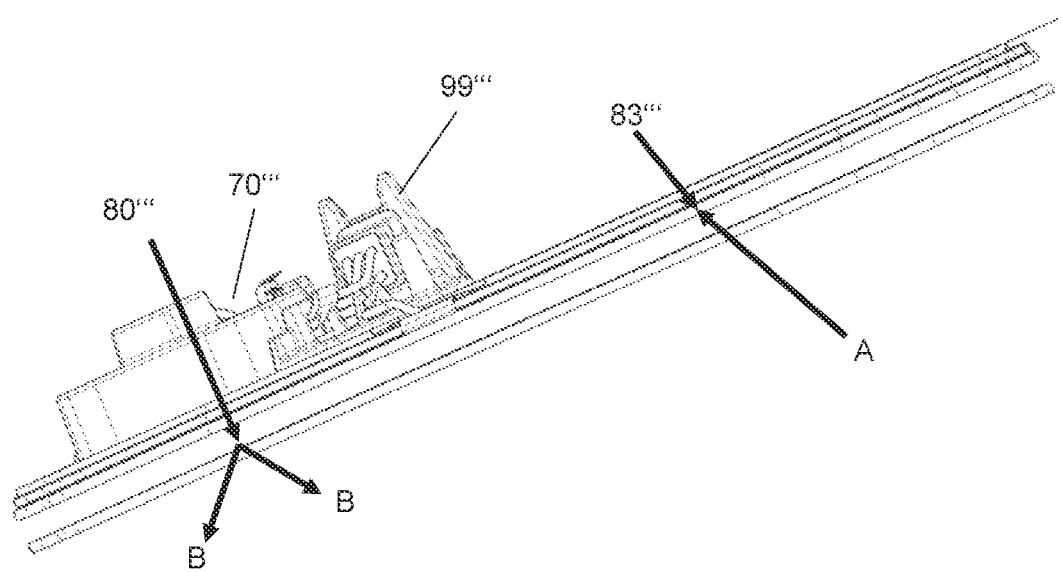
FIG. 5B is a cross-sectional view of the second third rearview device of FIG. 5A.

FIGS. 5A and 5B depict an alternative external rearview device 10", which can supplement the kits described above or replace one of the respective three different rear view devices 10, 10', 10". As each of the third rearview devices 10" shown in FIGS. 1C, 2C, 3D and 4C has the camera unit 85, 85' as sole unit of a camera monitor system arranged in the head assembly 60", 60"a, the dimensions and geometries of these head assemblies differ from the ones of the other two head assembly kit members. In contrast thereto, the external rearview device 10''' shown in FIG. 5A can provided an alternative third external rearview device with the same dimensions and geometries of the other two head assembly kit members, but fulfilling a different function, by having a display unit 83''' of a camera monitor system arranged in the head assembly 60'''.

The alternative third external rearview device 10''' comprises a base assembly 50''' onto which a moveable head assembly 60''' is attachable, wherein the alternative third head assembly 60''' comprises a reflective element in form of an at least partly translucent mirror glass 80''', and the display unit 83''' integrated in the head assembly 60''' by being arranged behind the at least partly translucent mirror glass 80''' in the view direction of a drive as indicated by the arrow A in FIG. 5B. This allows to present to a driver of a motor vehicle, to which the external rearview device 10''' is attached, a rearview either by reflections on the at least partly translucent mirror glass 80''' as indicated by the arrows B in FIG. 5B or on the display unit 83'''.

The display unit 83''' may be activated to present a rearview obtained by a camera unit 62''' arranged in the base assembly 50'''. Such an activation may be achieved by the driver for example by pressing a button on a dashboard, via a voice command, by a gesture or the like and/or depending on the output of a sensor (not shown). Such a sensor may be connected to a control unit 99''' for controlling the display unit 83''' and maybe also an articulation assembly 70''' for moving the head assembly 60'''. Said control unit 99''' may be arranged within the head assembly 60'''.

A sensor signal characteristic for contamination of a lens of the camera unit 62''' may be used to switch off the display unit 83''', whereas another sensor signal characteristic for high traffic situations and/or high speed may be used to switch on the display unit 83''', but many alternatives are within the teaching of the present disclosure.

The camera unit 62''' is arranged in the base assembly 50''' such that a lens thereof may obtain a rearview image through an opening provided by the base assembly 50'''. In detail, the camera unit 62''' may be attached to a base frame 51''', via a cradle or the like, and the opening may be provided by cover pieces of the base frame 51'''. Said cover pieces may comprise three pieces, namely the base covers 52''', 53''' and 56''' shown in FIG. 5A. Said base covers 52''', 53''' and 56''' correspond substantially to the ones described in detail in the German patent application DE 10 2021 107 597, to which reference is made in this respect. Thus, the base cover 52''' is provided in form of a base cover cap, the base cover 53''' is provided in form of a lower base cover and the base cover 56''' is provided in form of an upper base cover. Said three base covers 52''', 53''' and 56''' releaseably mantle the base frame 51''' by being attached via clip, snap and/or latch connections.

Still further, the cover may comprise a glare shield 58''', which is described in further detail below.

A further alternative third external rearview device, which is not shown, may comprise a third rearview means comprising at least one reflective element in form of an at least partly translucent mirror glass, a display unit integrated in the head assembly or provided together with the reflective element, and a camera unit being configured to obtain a rearview image through the reflective element.

The three alternative third external rearview device may each be comprised by a head assembly kit such that there are in fact five different head assemblies from which one can be selected when assembling a rearview device. In case only the third external rearview device of FIGS. 5A and 5B is comprised by the kit, the base assembly is provided with a camera. At least the second head assembly and/or the first third head assembly shown in FIGS. 1C, 2C, 3D and 4C may each be connected to a display unit which is arranged within the interior of the vehicle to present the rearview obtained via the respective camera to the driver, whereas such a display unit with the vehicle is not needed for the second third head assembly shown in FIG. 5A.

Further, a third third head assembly attachable to the base assembly may be equipped with a camera unit, in addition or as an alternative to a camera unit installed in the base assembly for the second third head assembly. This might result in a rearview device with two camera units such that there is a fallback camera unit, in case one of the two camera units is not functioning correctly.

The camera unit 62''' of FIG. 5A is attached to the base assembly 50'''. Details of the respective attachment as well as the attachment of the glare shield 58''' are explained with reference to FIGS. 5C to 5E in the following.

Figure 5C:
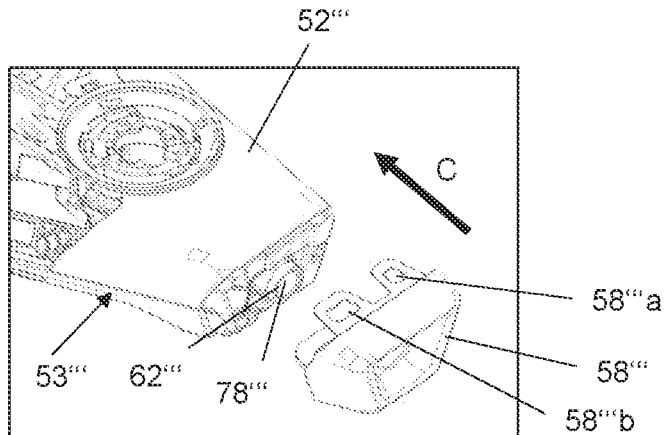
FIG. 5C is a perspective view of the external end of the base assembly of the second third rearview device of FIG. 5A, prior to attachment of a glare shield.
Figure 5D:
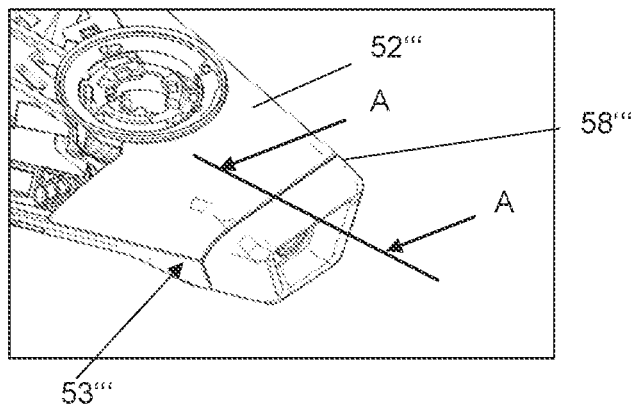
FIG. 5D is a perspective view of the external end of the base assembly of the second third rearview device of FIG. 5A, with the attached glare shield.
Figure 5E:
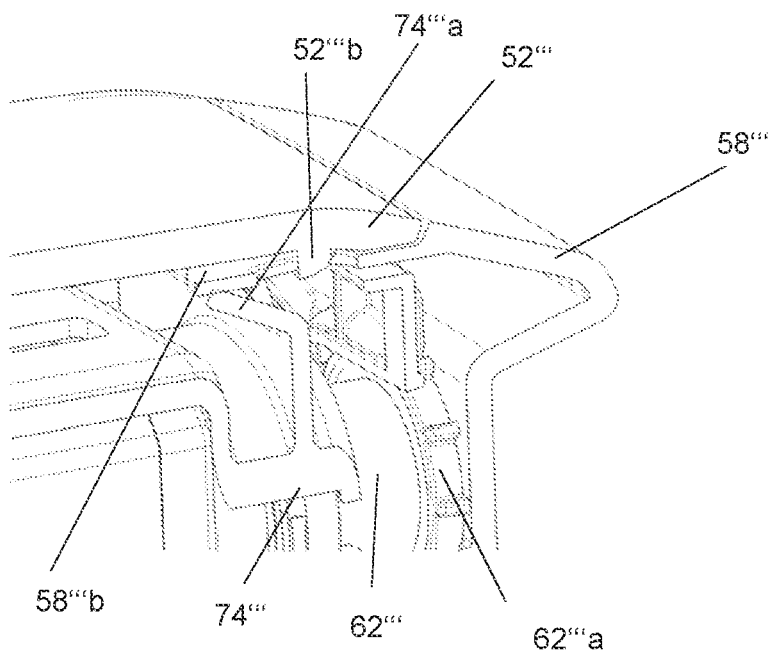
FIG. 5E is a cross-sectional view along the line AA shown in FIG. 5D.

As can be seen in FIGS. 5C and 5E, the glare shield 58''' is provided with two clips 58'''a, 58'''b to be attached to the base cover cap 52''' as well as to a camera cradle 74''', which serves to attach the camera 62''' to the base frame 51'''. This attachment may be the last assembly step on a customer line by sliding the glare shield 58''' along the arrow C as indicated in FIG. 5C.

FIG. 5D shows the assembled glare shield 58''' and details thereof can be seen in the cross-section taken along line AA in FIG. 5E. Accordingly, each clip 58'''a, 58'''b or the like of the glare shield 58''' engages the base cover cap 52''', in particular an extension, lug 52'''b thereof. The free end of the clip 58'''b is shown in FIG. 5E to be holed by a retention tab 74'''a of the camera cradle 74'''. This arrangement allows to maintain a small tolerance stack between the different components, with integrity of the glare shield 58''' being protected. Further, serviceability is facilitated by this arrangement.

FIG. 5E also shows that an outer-rim 62'''a of the camera unit 62''' extends beyond the camera cradle 74''' as well as the base cap cover 52''', but is shielded by the glare shield 78'''. The rim 62'''a encompasses the lens 78'''.

FIG. 6A depicts the backbone of a rearview device of an embodiment of the present disclosure in form of a cradle 90. The cradle 90 provides a motor opening 91 for the attachment of a motor, a base seat 92 in order to be attached to a base assembly, tool openings 93a, 93b in order to attach the cradle 90 to a jig like light tool to facilitate assembly of the rearview device, openings 94a, 94b for attaching a bezel assembly and harness and a clamp element 95 for embracing a clamp cradle. The following FIGS. 6B to 6C will further illuminate the different functions of the cradle 90 for the connection between a base assembly and a head assembly.

As can be seen from FIG. 6B, the cradle 90 can be placed with its seat 92 on a base assembly 61 with sealing means 97 being arranged there between and a case frame 88 being attached to the base frame 61 and thereby attaching the cradle 90 to the base assembly 61.

FIG. 6C demonstrates a pivot joint system acting between the base assembly 61 and the case frame 88 and, thus, the head assembly, with the cradle 90 being arranged between the base assembly 61 and the case frame 60, surrounded on each side of its seat 92 by sealing means 96, 97. Said pivot joint system corresponds substantially to the one described in detail in the international patent application PCT/EP 2018/063665, to which reference is made in this respect.

Each sealing element 96, 97 is provided as a two component gasket with a hart part and a soft part. The hard part serves for attachment and the soft part for compensating tolerances. FIG. 6D shows the pivot joint system in more detail with respect to the relative arrangement of the two sealing means 96, 79 on both sides of the base seat 92 of the cradle 90.

The rearview device of the present disclosure can be provided with a plurality of different functional modules, comprising a further camera, further light modules, a display, a Bluetooth module, a sensor module and the like. With respect to FIGS. 7A to 8 the mounting of cameras is further described.

Figure 7A:
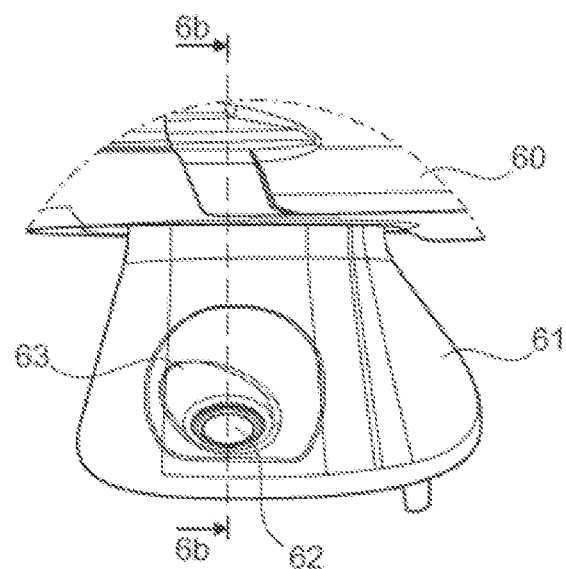
FIG. 7A and FIG. 7B are diagrams illustrating a front view of a camera located within a base assembly and a respective section view along the line 6b-6b illustrated in FIG. 7A.
Figure 7B:
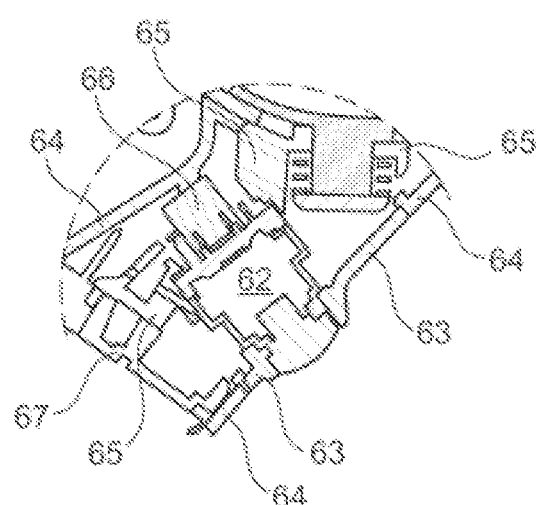

Referring to FIGS. 7A and 7B, due to the movement of a head assembly 60, a non-moving area for securing a further camera 62 may be used. In this example, the camera 62 is positioned in a solid, non-moving area which does not move when the head actuates. FIGS. 7A and 7B show the camera 62 located in a mirror base assembly 61 fixed on a base frame 65 with a camera connector 66. The camera 62 is covered by a base cap 63 and the base assembly is covered by a base cover 64 and secured via a gasket 67 to a motor vehicle (not shown). FIG. 7B illustrates a section view along the line 6b-6b of FIG. 7A. In this example, the camera 62 is fixed in the mirror base assembly 61 of a rearview device.

Figure 8:
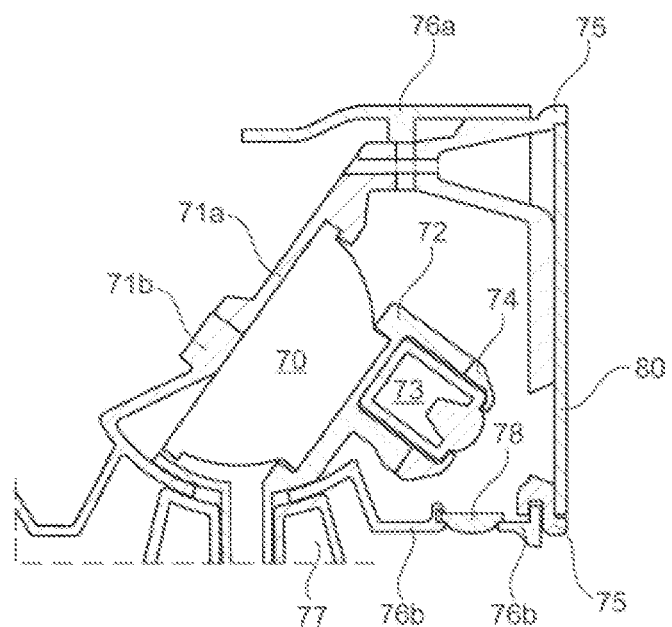
FIG. 8 is a diagram illustrating a side cross-sectional view of a head assembly with a camera located on a fixed base frame.

In another example, the camera may be fixed to the head assembly 60. As shown in FIG. 8, a camera 73 is mounted on a base frame 72 that is connected to a base assembly 77. Attached to the base frame 72, as well, is an articulation assembly 70 that moves the mirror head connected via an upper cradle 71a and lower cradle 71b. An upper casing element 76a is connected to the upper cradle 71a, and a lower casing element 76b is connected to the lower cradle 71b. The head assembly is finally locked through a bezel 75 that carries a reflective element in form of a mirror glass 80.

The camera 73 is fixed by a camera cradle 74 and is directed to view through an opening in the bezel 75 through the glass 80 and/or to view under the mirror through a lens 78, which is installed in the lower casing element 76b. As in the configuration of FIGS. 7A and 7B, the camera of FIG. 8 is secured to a solid, non-moving area that does not move when the head actuates. The camera 73 is packaged into the case frame of the head assembly 60. This provides the camera 73 with a number of different fields of view; in particular, producing at least images of the rear of the vehicle, the side of the vehicle, the front of the vehicle, or the underneath the mirror or the vehicle. In the illustrated example, the camera 73 is directed to view behind the vehicle through the glass 80 and underneath the mirror through the lens 78.

The camera 73 can be comprised by the camera unit 85 described with respect to FIG. 1B.

Figure 9A:
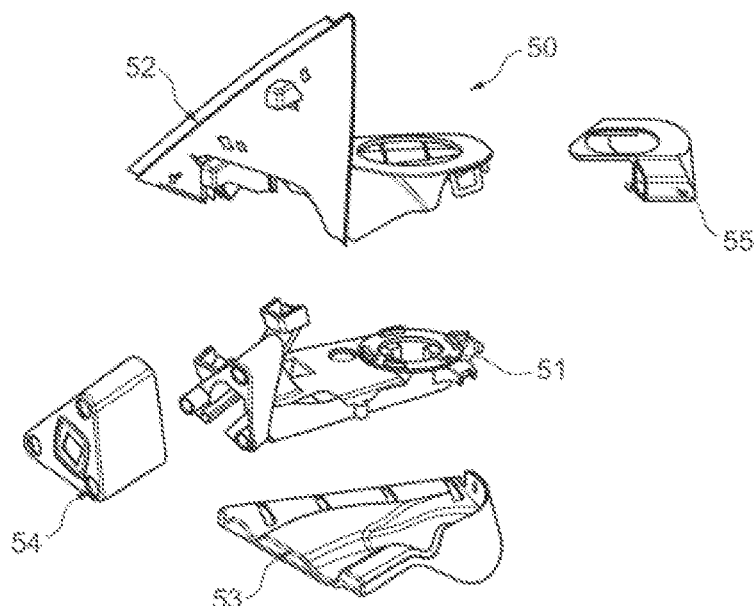
FIG. 9A is an exploded view of a first base assembly.
Figure 9B:
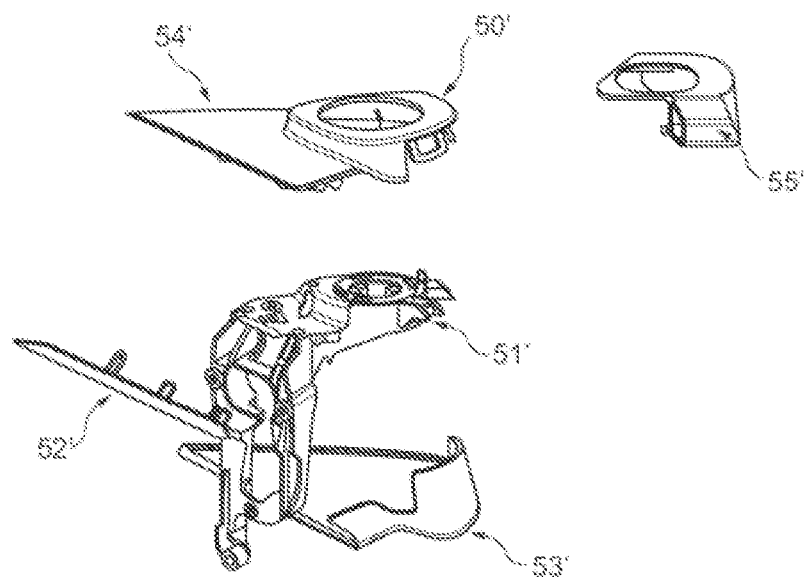
FIG. 9B is an exploded view of a second base assembly.
Figure 9C:
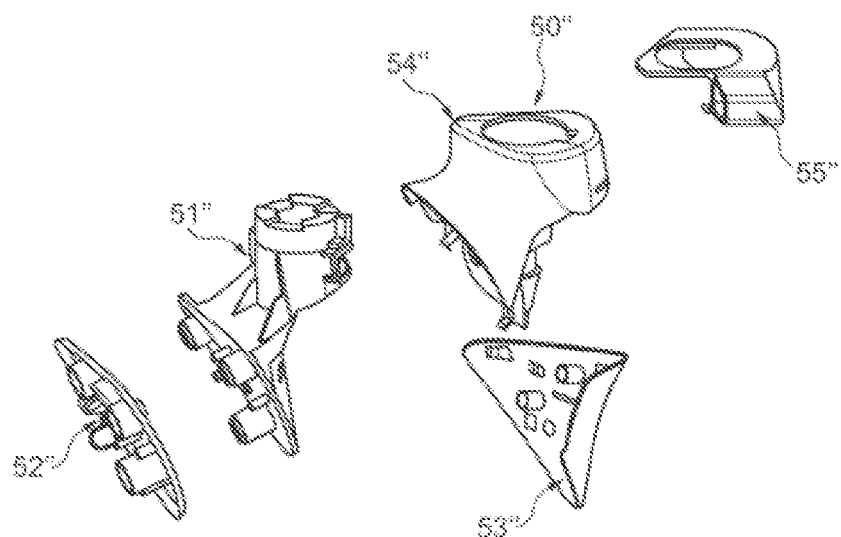
FIG. 9C is an exploded view of a third assembly.

The base assembly can also be selected from a plurality of different designs for adaptation to different vehicles. As different car manufactures prefer different designs, also of their rearview devices, the provision of a plurality of base assemblies enables to adapt to the respective preferences. FIGS. 9A, 9B and 9C depict three design variants of the base assembly.

The design variant of FIG. 9A shows a sail mount base assembly 50 with a base frame 51, an upper and a lower base cover 52, 53, a gasket 54 and a pivot seal 55. The design variant of FIG. 9B shows a waist mount base assembly 50' with a base frame 51', two base covers 52', 53', a gasket 54' and a pivot seal 55'. The design variant of FIG. 9C shows a door mount base assembly 50" with a base frame 51", two base covers 52", 53', a gasket 54''' and a pivot seal 55".

Other variants also lie within the scope of this present disclosure. All possible base assemblies have in common that they provide a head assembly interface suited to attach any one of the head assemblies described above to provide maximal flexibility. That is, as the different base assemblies are adapted to the different vehicles and the different head assemblies provide different rearview options, different vehicles can be equipped with different rearview options by making usage of a rearview device kit of the present disclosure. Thus, the present disclosure provides a standardization of modules in order to fulfill different legal requirements or personal preferences independent on the vehicle.

Still further, different functions and devices can be incorporated into and/or controlled with the help of rearview devices.

Especially useful are functions and devices to enhance, extend and/or sustain the functionality of the rearview device during normal or extreme conditions. This may include heating and/or cooling means, cleaning means such as wipers, liquid and/or gaseous sprays, actuator means for moving the rearview device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rearview devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device including an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REARVIEW DEVICE AND MOTOR VEHICLE and claiming priority to European patent application No. 2944866, filed on May 12, 2014 for OPTICAL UNIT, DISPLAY DEVICE, REARVIEW DEVICE AND MOTOR VEHICLE INCLUDING THE SAME which are all hereby incorporated herein by reference. Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REARVIEW DEVICE which are all hereby incorporated herein by reference. A lighting device for a rearview device or a footwell device of a vehicle, including at least one luminous means is disclosed in German patent application No. 102015115555, filed on Sep. 9, 2015 for ILLUMINATION DEVICE, REARVIEW DEVICE, FOOTWELL DEVICE AND VEHICLE which is hereby incorporated herein by reference. A light module for a light assembly of an exterior rearview device is disclosed in European patent application No. 3138734, filed on Sep. 3, 2015 for LIGHT MODULE, LIGHT ASSEMBLY AND REARVIEW DEVICE FOR A VEHICLE which is hereby incorporated herein by reference. A lighting device for a vehicle component, in particular for a rearview device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No.

102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REARVIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REARVIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537, 451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application Ser. No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application Ser. No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REARVIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REARVIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on Jul. 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REARVIEW DEVICE FOR A MOTOR and published as US 20150358590, which is hereby incorporated herein by reference.

It will be appreciated by those skilled in the art that changes could be made to the embodiments described above without departing from the broad inventive concept thereof. It is understood, therefore, that the present disclosure disclosed herein is not limited to the particular embodiments disclosed, and is intended to cover modifications within the spirit and scope of the present disclosure.

REFERENCE SIGNS 10, 10', 10", 10''' rearview device
50, 50', 50", 50''' base assembly
51, 51', 51", 51''' base frame
52, 52'a, 52'b, 52", 52''' base cover
52'''b lug
53, 53', 53", 53''' base cover
54, 54', 54" gasket
55, 55', 55" pivot seal
56''' base cover
58''' glare shield
58'''a, 58'''b clip
60, 60', 60", 60''' head assembly
60a, 60"a upper cover
60aa attachment means
60b, 60'''b lower cover
60c, 60'c, 60"c front cover
60"cc opening
61 base assembly
61a bayonet tower
62, 62''' camera
62'''a rim
63 base cap
64 base cover
65 base frame
66 camera connector
67 gasket
70, 70''' articulation assembly
71a upper cradle
71b lower cradle
72 base frame
73 camera
74, 74''' camera cradle
74'''a tab
75, 75', 75" bezel
75'a opening
76a upper casing element
76b lower casing element
77 base assembly
78, 78''' lens
80, 80''' glass
81 indicator means
82 turn signal indicator module
83''' display unit
85, 85' camera unit
88, 88" case frame
89 articulation assembly
89a, 89'a, 89"a attachment means
90 motor cradle
91 motor opening
92 base seat
93a tool opening
93b tool opening
94a opening
94b opening
95 clamp element
96 sealing means
97 sealing means
99''' control unit
100 vehicle
A viewing direction
B reflection direction

The invention claimed is:

1. An assembly set for assembling an external rearview system for a motor vehicle, the external rearview system when assembled including (i) a base assembly provided for arrangement on the motor vehicle, and (ii) a head assembly attached to the base assembly, the assembly set comprising:
   a first head assembly comprising,
      a first rearview device comprising at least one reflective element in form of a mirror glass, and
   a second head assembly comprising at least one reflective element in form of an at least partly translucent mirror glass, a display unit integrated in the head assembly or provided together with the reflective element, and at least one camera unit, the camera unit configured to obtain a rearview image through the reflective element,
   wherein the head assembly is configured to be detachable and is selected to be the first or second head assembly, with the first and second head assembly being exchangeable with each other, and
   (iii) a control unit for controlling the at least one camera unit and the display unit, wherein at least one sensor unit is connected to the control unit, and wherein the display unit is configured to be viewable through the reflective element when activated depending on an output signal of the at least one sensor unit, via the control unit.

2. The assembly set of claim 1, further comprising
   at least one second camera unit configured to obtain an image through an opening provided by the base assembly of the head assembly.

3. The assembly set of claim 2, further comprising
   an articulation assembly for moving the head assembly relative to the base assembly.

4. The assembly set of claim 3, further comprising
   the control unit for controlling the articulation assembly.

5. The assembly set of claim 1, wherein the display unit is configured to be
   activated by at least one of a driver of the motor vehicle, depending on the output signal of the sensor unit, via a vehicle control system or via a control unit provided by the external rearview device.

6. The assembly set of claim 1, wherein
   the first and/or second head assembly is moveably attachable to the base assembly, and
   the base assembly is fixed relative to the motor vehicle.

7. The assembly set of claim 1, further comprising at least one functional module, comprising,
   a light module, a turn signal indicator module, a blind spot indicator module, or a human machine interface,
   a Bluetooth module and
   a sensor module, a temperature sensor, a touch sensor or a contamination sensor.

8. The assembly set of claim 1, further comprising at least one of
   at least one first camera connector or camera cradle, which is positioned in a nonmoving area of the moveable head assembly and receives a first camera unit, or
   at least one connector cradle, which is positioned in the base assembly and receives a second camera unit.

9. The assembly set of claim 1, wherein
   the first and second head assembly each comprises at least one cover element having the same structure.

10. The assembly set of claim 9, wherein
    the at least one head assembly cover element comprises an upper cover, a lower cover and a front cover.

11. The assembly set of claim 10, wherein
at least one of the upper cover, the lower cover or the front cover fits the first and second head assembly or are identical for each head assembly.
12. The assembly set of claim 10, wherein
the at least one head assembly cover element comprises a bezel.
13. The assembly set of claim 12, wherein
the bezel of the second head assembly has an opening such that the first camera unit can obtain a rearview image through the reflective element.
14. The assembly set of claim 1, wherein
the base assembly comprises a base frame and at least one cover element to releaseably mantle the base frame by being attached via clip, snap and/or latch connections.
15. The assembly set of claim 14, wherein
the at least one base assembly cover element comprises an upper base cover, a lower base cover and a base cover cap.
16. The assembly set of claim 14, wherein
each unit is partly extending through an opening in at least one of the base cover elements, or
at least one of a rim or a lens of each second camera unit is arranged in front of the at least one base cover elements.
17. The assembly set of claim 14, wherein
the at least one base assembly cover element comprises at least one glare shield surrounding a lens of a second camera unit and providing an opening through which the second camera unit attached to the base assembly can obtain an image.
18. The assembly set of claim 17, wherein
each glare shield is configured to be releaseably attached to at least one of the at least one base assembly cover element or a second camera connector or camera cradle via at least one of a clip, snap or latch connection.
19. The assembly set of claim 18, wherein
the glare shield is provided with at least one clip.
20. The assembly set of claim 19, wherein the at least one clip of the glare shield is configured to at least one of
engage the base cover cap or at least one extension or lug of the base cover cap or
be supported by the second camera cradle or at last one retention tab of the second camera cradle.

21. The assembly set of claim 20, wherein,
in the view direction of a first second camera unit, the second camera cradle is arranged at least partly in front of the base frame, the base cover cap is arranged at least partly in front of the second camera cradle, and the glare shield is arranged at least partly in front of the base cover cap.
22. The assembly set of claim 15, wherein,
a second unit obtains an image through an opening provided by the upper base cover, or
a third second camera unit obtains an image through an opening provided by the lower base cover.
23. Vehicle with at least one external rearview system, according to claim 1.
24. An external rearview device for a motor vehicle, comprising:
a base assembly provided for arrangement on the motor vehicle, and
a head assembly attached to the base assembly, the head assembly comprising
a first head assembly comprising a first rearview device comprising at least one reflective element in form of a mirror glass, and
a second head assembly comprising
at least one reflective element in form of an at least partly translucent mirror glass,
a display unit integrated in the head assembly or provided together with the reflective element, and
at least one camera unit, the camera unit configured to obtain a rearview image through the reflective element
wherein the head assembly is configured to be detachable and is selected to be the first or second head assembly, with the first and second head assembly being exchangeable with each other, and
a control unit for controlling the at least one camera unit and the display unit, wherein at least one sensor unit is connected to the control unit, and wherein the display unit is configured to be viewable through the reflective element when activated depending on an output signal of the at least one sensor unit, via the control unit.

* * * * *